(12) United States Patent
Boutet et al.

(10) Patent No.: US 10,479,709 B2
(45) Date of Patent: Nov. 19, 2019

(54) WATER TREATMENT SYSTEM AND METHOD

(71) Applicant: BIONEST TECHNOLOGIES INC., Shawinigan (CA)

(72) Inventors: Etienne Boutet, Trois-Rivières (CA); Serge Baillargeon, Trois-Rivières (CA); Garfield R. Lord, Providenciales (TC)

(73) Assignee: BIONEST TECHNOLOGIES INC., Grand-Mere (CA)

( * ) Notice: Subject to any disclaimer, the term of this patent is extended or adjusted under 35 U.S.C. 154(b) by 0 days.

(21) Appl. No.: 15/520,586

(22) PCT Filed: Oct. 20, 2015

(86) PCT No.: PCT/CA2015/000547
§ 371 (c)(1),
(2) Date: Apr. 20, 2017

(87) PCT Pub. No.: WO2016/061664
PCT Pub. Date: Apr. 28, 2016

(65) Prior Publication Data
US 2017/0313607 A1 Nov. 2, 2017

Related U.S. Application Data

(60) Provisional application No. 62/066,033, filed on Oct. 20, 2014.

(51) Int. Cl.
*C02F 3/06* (2006.01)
*C02F 3/00* (2006.01)
(Continued)

(52) U.S. Cl.
CPC .............. *C02F 3/06* (2013.01); *C02F 3/006* (2013.01); *C02F 3/10* (2013.01); *C02F 3/101* (2013.01);
(Continued)

(58) Field of Classification Search
CPC .... C02F 3/06; C02F 7/00; C02F 3/101; C02F 2103/007; C02F 3/10; C02F 3/087; C02F 3/1257; A01K 63/04
(Continued)

(56) References Cited

U.S. PATENT DOCUMENTS 3,235,234 A  2/1966  Beaudoin
5,122,266 A  6/1992  Kent
(Continued)

FOREIGN PATENT DOCUMENTS

GB  2489037 A  9/2012
WO  09315024 A1  8/1993
(Continued)

OTHER PUBLICATIONS

Extended European Search Report regarding EP 15853158.2, dated Apr. 10, 2018.
(Continued)

*Primary Examiner* — Claire A Norris
(74) *Attorney, Agent, or Firm* — BCF LLP

(57) ABSTRACT

A water treatment system comprising a first reactor and a second reactor arranged to be placed in series in a body of water, the first and/or second reactor comprising at least one cell for housing biomedia. A mid-settling zone is provided between the first and second reactors for separating solids in the water. A method of treating water, the method comprising passing water to be treated through a first reactor and then a second reactor arranged in series in a body of water, the first and/or second reactors comprising at least one cell for housing biomedia, wherein the water is passed through a mid-settling zone between the first and second reactors before passing through the second reactor.

20 Claims, 7 Drawing Sheets

(51) Int. Cl.
*C02F 3/10* (2006.01)
*C02F 7/00* (2006.01)
*C02F 3/12* (2006.01)
*C02F 3/20* (2006.01)
*C02F 3/30* (2006.01)
*C02F 101/16* (2006.01)

(52) U.S. Cl.
CPC .............. *C02F 3/109* (2013.01); *C02F 3/121* (2013.01); *C02F 3/1247* (2013.01); *C02F 3/1257* (2013.01); *C02F 3/20* (2013.01); *C02F 3/301* (2013.01); *C02F 3/303* (2013.01); *C02F 3/308* (2013.01); *C02F 7/00* (2013.01); *C02F 2101/16* (2013.01); *C02F 2201/007* (2013.01); *C02F 2203/006* (2013.01); *C02F 2203/008* (2013.01); *C02F 2209/04* (2013.01); *C02F 2209/08* (2013.01); *C02F 2209/38* (2013.01); *C02F 2209/40* (2013.01); *Y02W 10/15* (2015.05); *Y02W 10/37* (2015.05)

(58) Field of Classification Search
USPC ........... 210/615, 150, 170.05, 170.09, 242.1, 210/170.01, 747.5, 926
See application file for complete search history.

(56) References Cited

U.S. PATENT DOCUMENTS

| | | | |
|---|---|---|---|
| 5,344,557 A | 9/1994 | Scanzillo | |
| 5,421,999 A | 6/1995 | Poole et al. | |
| 5,507,950 A | 4/1996 | Senda et al. | |
| 5,861,095 A | 1/1999 | Vogel et al. | |
| 6,136,194 A | 10/2000 | Vogel et al. | |
| 6,344,144 B1 | 2/2002 | Long | |
| 6,348,147 B1 | 2/2002 | Long | |
| 6,444,126 B1 | 9/2002 | Gates et al. | |
| 6,770,200 B2 | 8/2004 | Tharp et al. | |
| 7,041,219 B2 | 5/2006 | Tharp et al. | |
| 7,347,940 B2 | 3/2008 | Austin | |
| 7,582,211 B2 | 9/2009 | Lord | |
| 8,066,873 B2 | 11/2011 | Kaw | |
| 8,293,098 B2 | 10/2012 | Smith et al. | |
| 8,318,008 B1 | 11/2012 | Anderson | |
| 8,758,620 B2 | 6/2014 | Tharp et al. | |
| 8,821,729 B2 | 9/2014 | Pajuniemi et al. | |
| 2005/0011829 A1* | 1/2005 | Dong ................... | C02F 3/2806 210/603 |
| 2005/0269262 A1 | 12/2005 | McBride | |
| 2011/0108472 A1 | 5/2011 | Kania et al. | |
| 2012/0279919 A1 | 11/2012 | Atzmon | |
| 2013/0327710 A1 | 12/2013 | Reid | |
| 2014/0284273 A1 | 9/2014 | Tharp et al. | |
| 2015/0041376 A1* | 2/2015 | Fulford ................... | C02F 3/103 210/143 |

FOREIGN PATENT DOCUMENTS

| | | |
|---|---|---|
| WO | 1994016999 A1 | 8/1994 |
| WO | 1999065829 A1 | 12/1999 |
| WO | 2003027031 A1 | 4/2003 |
| WO | 2009033291 A1 | 3/2009 |
| WO | 2012123767 A2 | 9/2012 |

OTHER PUBLICATIONS

Extended European Search Report regarding EP 15853413.1 dated Mar. 7, 2018.
Blanc, R. et al. "Respirometry as a Simple Operational Tool for Monitoring of MBBR and IFAS Biofilm Systems" Proceedings of the Water Environment Federation, 2010, vol. 2010, No. 7, p. 337-352.
Odegaard, H. et al. "The Influence of Carrier Size and Shape in the Moving Bed Biofilm Process" Water Science & Technology, 2000, vol. 41, p. 383-391.
Krantzberg, G. "Advances in Water Quality Control" Scientific Research Publishing, USA, 2010, Chapter three, p. 73-124.
International Search Report and Written Opinion with regard to PCT/CA2015/000547 dated Feb. 8, 2016.

* cited by examiner

WATER TREATMENT SYSTEM AND METHOD

CROSS-REFERENCE TO RELATED APPLICATIONS

This application claims the benefit of U.S. Provisional Patent Application Ser. No. US 62/066,033, filed on Oct. 20, 2014. The contents of the aforementioned application are incorporated by reference herein.

FIELD OF THE DISCLOSURE

The present disclosure relates to water treatment systems and water treatment methods, and more specifically, though not exclusively, to water treatment systems and methods in lagoons.

BACKGROUND OF THE DISCLOSURE

Aerated lagoons or ponds are one way of treating municipal wastewater. These bodies of water are mechanically aerated to oxygenate and to mix water. In northern climate conditions such as those found in Canada, these lagoons typically comprise 2 to 4 basins offering large volumes with corresponding minimum retention time typically between 15 and 60 days to achieve less than 25 mg/l 5-day carbonaceous biochemical oxygen demand ($CBOD_5$). The 5-day carbonaceous biochemical oxygen demand ($CBOD_5$) represents a measure of the rate of oxygen uptake by micro-organisms at 20° C. in 1 litre of wastewater over 5 days and is a typical wastewater quality indicator set by legislative authorities in some countries. Other quality indicators include Total Suspended Solids (TSS), typically measured through sieves varying between 0.45 and 2.0 μm after a sample is evaporated to dryness, Total Kjeldahl Nitrogen (TKN) representing the sum of organic nitrogen, ammonia ($NH_3$) and ammonium ($NH_4^+$), and Total nitrogen (TN) which includes TKN as well as nitrates ($NO_3^-$) and nitrites ($NO_2^-$).

Although lagoons do not have a high treatment efficiency compared to tank-based water treatment systems, they are the most popular municipal wastewater treatment in Canada with more than 2000 lagoons. In the province of Québec alone, there were 633 lagoons in 2013 amongst 811 municipal treatments. Land availability, availability of skilled operators, high dilution capacity of receiving water bodies and non-restrictive discharge requirements and economic aspects have led to the popularity of lagoons. However, urban development and environmental pressure requiring more stringent discharge requirements are challenging the past advantages.

In an aerated lagoon with no sludge recirculation, biomass is found in suspension in concentrations in the order of about 100 to 400 mg TSS/l. A clarifier near the outlet can increase biomass concentration, but the operation of clarifier equipment requires skilled labour, expensive equipment, and is not possible in cold climates especially when there is an ice cover.

Furthermore, due to the low kinetics of nitrifying bacteria especially at temperatures below 8° C., the poor hydraulic efficiency of lagoons and the low biomass concentration, nitrification in some countries is possible only during the warmer months, for example during part of the summer under the $47^{th}$ parallel in Canada. Nitrogen removal through denitrification is seldom observed in lagoons.

Therefore, there is a need for water treatment systems and methods which overcome or reduce at least some of the above-described problems.

SUMMARY OF THE DISCLOSURE

Certain aspects and embodiments of the present disclosure may overcome or reduce some of the abovementioned problems and disadvantages. For example, by means of certain aspects and embodiments of the present disclosure, the treatment capacity in a given water body volume such as a lagoon, may be increased and/or treatment quality improved.

From a first aspect, there is provided a water treatment system comprising a first reactor and a second reactor arranged to be placed in series in a body of water, the first and/or second reactor comprising at least one cell for housing biomedia, wherein there is provided a mid-settling zone between the first and second reactors for separating solids in the water.

From another aspect, there is provided a water treatment system comprising a first reactor, a second reactor and at least one settling zone, wherein the first and/or second reactor comprise at least one cell for housing biomedia and wherein the settling zone is between the first and second reactors.

From a yet further aspect, there is provided a water treatment system comprising a first reactor and a second reactor arranged to be placed in series in a body of water, the first and/or second reactor comprising at least one cell for housing biomedia, wherein the first reactor is arranged to operate at a higher loading rate than the second reactor.

In certain embodiments, the system does not include recirculation of the water to be treated. In certain embodiments, the system comprises a water treatment chain going from the first reactor, through the settling (mid-settling) zone, then to the second reactor.

In certain embodiments, the water treatment system is installed in a body of water having an inlet and an outlet. In certain embodiments, the water treatment system comprises an inlet through which the water to be treated is introduced to the system, and an outlet through which the treated water is discharged. In certain embodiments, the treated water is discharged without recirculation. In other words, the water to be treated passes directly through the treatment chain without recirculation. In certain embodiments, the inlet is upstream of the first reactor and/or the inlet settling zone. In certain embodiments, the outlet is downstream of the second reactor and/or the outlet settling zone.

From a further aspect, there is provided a water treatment system comprising an inlet through which the water to be treated is introduced to the system, a first reactor and a second reactor arranged to be placed in series in a body of water, the first and/or second reactor comprising at least one cell for housing biomedia, a mid-settling zone between the first and second reactors for separating solids in the water, and an outlet through which the treated water is discharged. In certain embodiments, the system does not include recirculation of the waste water. In certain embodiments, the treatment chain of the system is arranged to pass the water to be treated from the inlet, then the first reactor, then the mid-settling zone, then the second reactor, and then the outlet. In this way, the water to be treated passes directly through the treatment chain without recirculation.

The system is a continuous flow system. By continuous flow is meant that water is substantially continuously fed to the system without any prior equalization, the water being partially equalized in the system as it flows through the different zones before being discharged at the effluent. The different physical, biological and chemical treatment mechanisms occur at the same time in pseudo-steady-state conditions but at different locations in the continuous flow system unlike in sequencing batch reactors where all mechanisms take place at the same location but at different time in non-steady-state conditions. Advantageously, embodiments of the present system which are continuous flow do not require a complex control system and additional mechanical components such as timers and decanters which are needed in sequencing batch reactor systems.

Furthermore, aeration does not need to be stopped for settling therefore bioconversion can be ongoing. Furthermore, unlike in sequencing batch reactors, the embodiments of the present system do not need effluent equalisation where subsequent treatment steps are required. In other words, certain embodiments of the present system comprise a substantially continuous input of water to be treated and a substantially continuous output of treated water.

In certain embodiments, the system also comprises an inlet settling zone upstream of the first reactor. In this way, the water to be treated can pass through the inlet settling zone before treatment by the first reactor. In certain embodiments, the system also comprises an outlet settling zone downstream of the second reactor. In this way, the water to be treated can pass through the outlet settling zone after treatment by the second reactor. In certain embodiments, the system comprises an inlet settling zone, a first reactor, a mid-settling zone, a second reactor and an outlet settling zone, all in series.

In certain embodiments, the system may comprise baffles or curtains separating the settling zones (e.g. inlet, outlet and mid-settling zones) from each other or from the reactors. The mid-settling zone is a non-aerated body of water. Any one or more of the mid-settling zone, inlet settling zone and outlet settling zone comprise a non-aerated body of water. The first and/or second reactors may be aerated.

In certain embodiments, any one or more of the mid-settling zone, inlet settling zone and outlet settling zone are adapted to allow for solid settling. In certain embodiments, any one or more of the mid-settling zone, inlet settling zone and outlet settling zone are adapted for sludge accumulation or storage. The mid-settling zone, inlet settling zone or outlet settling zone may be sized and shaped for sludge retention. The size and shape of the mid-settling zone may be defined by the distance of the first and second reactors from one another. The retention time and size of any one of the settling zones (inlet, mid- or outlet) may be adapted according to whether and how much sludge retention is needed as well as settling of solids.

In certain embodiments, sludge retention may not be required, and so the system may include sludge removal equipment, such as a traveling-bridge sludge collector and a chain-and-flight sludge collector or any other suitable apparatus for removing sludge. In these embodiments, the overflow rate may range from 0.2 m/h to 2 m/h and the retention time from 1 h to 60 h.

In certain embodiments, the second reactor is arranged to be operated at a lower loading rate than the first reactor. In certain embodiments, the second reactor is arranged to operate at about 30-70%, about 40-60%, or about 50%, of the loading rate of the first reactor.

In certain embodiments, for example when the system is operating in a lagoon, the first reactor may be adapted to operate at a loading rate of about 2.0 to about 6.0 g of soluble carbonaceous biochemical oxygen demand per effective surface area of biomedia per day ($sCBOD_5/m^2 \cdot d$), or about 2.5 g $sCBOD_5/m^2 \cdot d$. In certain embodiments, for example when the system is operating in a lagoon, the second reactor is adapted to operate at a loading rate of about 0.5 to about 1.5 g of soluble $CBOD_5/m^2 \cdot d$, about 0.75 to about 1.25 g of soluble $CBOD_5/m^2 \cdot d$, or about 1.25 g of soluble $CBOD_5/m^2 \cdot d$. In certain embodiments, the second reactor is adapted to operate at a media loading rate of about 206 g of soluble CBOD per cubic meter of reactor per day.

In certain embodiments, for example when the system is operating at least partially in a tank or tanks, the first reactor may be adapted to operate at a loading rate of about 1.0 to about 2.0 g of soluble carbonaceous biochemical oxygen demand per effective surface area of biomedia per day ($sCBOD_5/m^2 \cdot d$), or about 1.4 g $sCBOD_5/m^2 \cdot d$. In certain embodiments, for example when the system is operating at least partially in a tank or tanks, the second reactor is adapted to operate at a loading rate of about 0.2 to about 1.0 g of soluble $CBOD_5/m^2 \cdot d$, about 0.4 g of soluble $CBOD_5/m^2 \cdot d$.

Soluble carbonaceous biochemical oxygen demand may be measured using standard methods known in the art, such as those referenced in Standard Methods for the Examination of Water and Wastewater, EW Rice, American Public Health Association, 2012. By effective surface area is meant the surface area of the biomedia available during use, as discussed by BLANC, R. et al "Respirometry as a simple operational tool for monitoring of MBBR and IFAS Biofilm systems", *Proceedings of the Water Environment Federation,* 2010, vol. 2010, no 7, p. 337-352, and ØDEGAARD, Hallvard et al "The influence of carrier size and shape in the moving bed biofilm process", *Water Science & Technology,* 2000, vol. 41, no 4, p. 383-391. It is to be distinguished from specific surface area. In some shapes and sizes of biomedia, niches become clogged very quickly meaning that the effective surface area is lower than the specific surface area.

In certain embodiments, the system further comprises at least one baffle positioned around the first and/or the second reactor for preventing water flow around the first and/or the second reactor.

In certain embodiments, the inlet settling zone has a hydraulic retention time of about 1.0 to about 3.0 days, about 1.5 to about 2.5 days, or about 2 days. In certain embodiments, the inlet settling zone has an overflow rate of about 0.5 and 2.0 m³/m² of mirror surface of body of water, per day. The overflow rate can be measured by daily flow rate divided by mirror surface of water body. The daily flow rate can be measured by any means e.g. a flow meter, a weir, etc.

In certain embodiments, a hydraulic retention time of the outlet settling zone is about 0.5 to about 1.5 days, or about 1 day. In certain embodiments, an overflow rate of the outlet settling zone is between about 1.0 and about 3.0, or about 0.5 and about 2.0 cubic meters of wastewater per square meter of surface area of water body measured at the top (mirror) per day (m³/m² of mirror surface of body of water per day).

In certain embodiments, the settling zone (mid-settling zone) between the first and second reactors has a hydraulic retention time of about 1.0 to about 4.0 days, about 1.5 to about 3.5 days, about 2 to about 3 days, about 2.5 days. In certain embodiments, the settling zone between the first and second reactors has an overflow rate of about 0.5 to about 2.0 m³/m²·d.

It will be appreciated that in certain embodiments, the maximum hydraulic retention time in the settling zones could be higher if the system is installed in a lagoon having a higher retention time than needed. For example, if an embodiment of the system having a first and second reactor and an inlet, outlet and mid-settling zone is installed in a lagoon having a total hydraulic retention time of 20 days, and the hydraulic retention time of the inlet settling zone is about 1 to 3 days, the hydraulic retention time of the mid-settling zone is about 1 to 4 days and the hydraulic retention time of the outlet settling zone is about 0.5 to 1.5 days, that leaves at least 11.5 additional days minus the retention time in the first and second reactors. The additional days could then be split proportionally between the three settling zones. The same applies to overflow rate. If the retention time is higher than needed, the overflow rates mentioned herein can be lower.

The body of water may be a lagoon. In certain embodiments, the body of water may be at least partially in a lagoon. The lagoon may be aerated or non-aerated. In certain embodiments where the body of water is a single body of water, the single body of water is non-aerated in order to provided non-aerated settling zones, and aeration is provided to the reactors only. In certain embodiments, the first and/or second reactors are aerobic and/or anoxic. In certain embodiments, the first and/or second reactors are not anaerobic.

The body of water may be a combination of different lagoons and/or tanks. For example, any one of the first and/or second reactors or the settling zones may be contained within tanks. The tanks may be made of concrete, fibreglass, or plastic. Any one or more of the settling zones (e.g. any one or more of the inlet, outlet and mid-settling zones) may be in a different body of water compared to the reactors. In certain embodiments, at least one of the settling zones are arranged to have sludge accumulation.

In certain embodiments, the system may further comprise a filter at or near the outlet of the body of water. The filter may comprise biomedia. In certain embodiments, the system further comprises a third reactor in series with the first and second reactors. The system may also comprise additional settling zones, for example, downstream or upstream of the third reactor.

The first and/or second reactors can take any suitable form in which microorganisms, such as bacteria, convert organic matter in the waste water through biological processes. The first and/or second reactors may include bacteria growth devices (biomedia) for the bacteria to grow on. The reactors may provide an aerobic, anaerobic or anoxic environment for the microorganism-led biological reactions.

In use, the cells containing biomedia will be submerged in the water to be treated. In certain embodiments, the first and/or the second reactor are adapted to float in a body of water with the at least one cell immersed in the water in use. In other embodiments, the first and/or second reactor are not buoyant.

In the buoyant reactor embodiments, the first and/or the second reactor comprise a buoyant structure from which the at least one cell is suspended. The at least one cell may be removeably attached to the buoyant structure. The buoyant structure can comprise any means which can float in water and which can support at least one cell. In one embodiment, the buoyant structure comprises hollow pipes. In certain embodiments, the buoyant structure may comprise polyethylene pipes, such as high density polyethylene. The buoyant structure may comprise a frame defining a plurality of openings. The frame may be grid-like. The grid-like frame may comprise a plurality of inter-crossing pipes. Some of these pipes may also supply gas to gas diffusers. In one embodiment, the openings are sized and shaped to allow one cell to pass therethrough, preferably with the cells in a lengthwise orientation.

In certain embodiments, the first and/or second reactor further comprises at least one detachably attachable cover for substantially covering the at least one cell. The cover may also substantially cover the openings of the frame. In this way, the covers may provide a walkway across the frame for convenient access to the cells of the reactors. In certain embodiments, the covers are substantially light impermeable or light filtering. This can control the growth of algae and plants within and above the cells. In certain embodiments, the covers are buoyant.

By means of buoyant reactors, installation, removal and maintenance may be facilitated. The positioning of the reactor and/or system may also be changed within the body of water to adjust for sludge accumulation capacity, clarification overflow, F/M ratio, etc. Also, as a floating assembly can rise and fall with water levels whilst keeping biomedia submerged, the biomass conversion is not compromised. In certain embodiments, the reactors have sufficient buoyancy to support the cells, biomass, snow and ice, plant growth, and operators. Buoyancy can be aided by providing buoyant structures making up the cells and reactor, such as the covers, cell supports, gas supply pipes etc.

In certain embodiments, the at least one cell in the first and/or the second reactor contains at least one aeration device. The aeration device can be a gas diffuser. The aeration device may comprise two gas diffusers for producing bubbles of different sizes. The two gas diffusers may be separately controlled. The system may also include a gas supply for supplying gas to the aeration device. As diffusers in different cells can be separately controlled, it may be possible to create aerated and anoxic regions within an array of cells for performing separate functions, e.g. nitrate breakdown in anoxic regions. The gas diffusers can be removeably attached to the first and/or the second reactor. The gas diffusers can be removeably attached to a cell of the first and/or the second reactor, for example to a distal end of a cell in use. In certain embodiments, the diffuser can be removed without dismantling the first and/or the second reactor.

In certain embodiments, the at least one cell comprises a water permeable wall adapted to retain biomedia within the cell. The wall may be a mesh having a mesh size suitable for retaining biomedia. In certain embodiments, the at least one cell may comprise a permeable wall such as a mesh at the top to keep biomedia submerged within water in use. In certain embodiments, the at least one cell may comprise a net for retaining biomedia. The net may be removed from the at least one cell for maintenance and replacement In certain embodiments, the system further comprises biomedia housed within the at least one cell of the first and/or the second reactor. The biomedia may be configured to be self-supporting within the water. The biomedia may comprise an unattached elongate thin film having a nest-like configuration in use. By means of the elongate thin film moving against itself and/or any aeration within the reactor, excess biofilm may slough off the film. The density of the biomedia may be close to that of water. In this way, the biomedia may float and may eliminate the need for a biomedia support. The biomedia may be made from any suitable material such as a polymer. The biomedia may be selected from polyethylene, polypropylene, acrylonitrile butadiene styrene (ABS) or polyvinyl chloride (PVC). In certain embodiments, the biomedia is an elongate film about 3.0 mm wide and about 0.2 mm thick. The biomedia may have a surface area of about 160 to about 330 $m^2$ per $m^3$ of water volume, or about 165 $m^2$ of biomedia per $m^3$ of water where carbonaceous removal is required. The biomedia may occupy a volume of about 1.0% up to 5.0% in the cell and/or reactor, between about 1.0 to about 3.0%, between about 1.3% and 4%, between about 1.5% and about 3.5%, or about 1.6%. The biomedia may occupy a volume of less than about 3.0% in the cell. Advantageously, in certain embodiments, the biomedia does not have any fixed niches and is non-clogging unlike other biomedia of the prior art, and does not require frequent maintenance. Also, as the biomedia is self-supporting, unattached and nest-like, it can spread to distribute itself in the cell's volume. This may be particularly advantageous in an anoxic zone which can be created by turning off a cell's gas diffusers. Normally in anoxic zones, a means for mixing the water is required. However, in certain embodiments of the present disclosure, the biomedia is distributed throughout the anoxic zone, therefore eliminating or reducing the need for a mixer. In certain embodiments, continuous bubbling through biomedia controls the biofilm in order to optimize substrate mass transfer inside the biofilm and to maintain the strict role of bacteria support with time. The coarse bubble diffuser may operate only few minutes per hour to promote sloughing of excess biomass on the media and control biofilm thickness.

In certain embodiments, the first and/or second reactor comprise a plurality of cells arranged as an array. The array may be a plurality of cells arranged in side-by-side vertical configuration. In certain embodiments, the number of cells in the first and/or second reactor can be modified. The cells can be arranged as an array in a size and shape suitable for the size, shape and volume of the body of water being treated. In certain embodiments, the first and/or second reactor are modular. The cells may be individually detachable and attachable to the reactor. In certain embodiments, by means of an array of cells, the physical stability of a buoyant reactor in the water may be improved as well as a reduction or prevention of tipping of the reactor especially during gas aeration. The maintenance of a substantially vertical alignment of a cell containing the biomedia may be advantageous in controlling biomass accumulation on the biomedia.

Tipping of an aerated cell may lead to gas bubbles escaping from the cell with inefficient scouring of the biomedia in the cell. This may then result in excessive biomass accumulation in the biomedia, potentially leading to oxygen diffusion deficiency and hydraulic short-circuiting.

In certain embodiments, the cells are modular and comprise at least one unit, the units being detachably attachable to one another to vary the length of the cell. In other words, the cells may comprise vertically stackable units. In this way, a reactor having a cell of a length appropriate to the depth and requirements of the body of water may be provided. Advantageously, each unit may comprise one or more biomedia held within the unit by a mesh. In this way, a substantially even distribution of the biomedia may be achieved within each unit and hence within each cell. In this specification, the terms "unit", "segment" and "section" in relation to modular cells, are used interchangeably.

The modularity of each cell into units and/or the ability to separately attach and detach each cell from the reactor may provide ease of installation and removal of the reactor. The reactor may be installed and removed unit by unit or cell by cell. The reactor may be installed on site by attaching one cell unit at a time to a frame or buoyant structure of the reactor. The reactor may be installed on site by providing pre-assembled cells comprising a plurality of vertically stacked units and optionally an aeration device and attaching one cell at a time to a frame or buoyant structure of the reactor. Each cell may be attached to the frame or buoyant structure by lowering the cell through an opening before attaching the frame or buoyant structure. As a cell or cell unit will weigh less than an entire reactor, the installation and removal of a reactor may be achieved without the need for expensive and bulky lifting equipment. Also, one cell at a time may be removed for maintenance thereby avoiding the need for down-time of the reactor.

The modularity of the reactor and system in certain embodiments facilitates its transportation to a body of water site and allows it to be retrofit into different sizes, shapes and configurations of water. Installation does not require the use of heavy machinery and the assembly on site can be performed by unskilled manpower. As the assembly is modular, portions may be removed and replaced as needed.

Furthermore, in certain embodiments, the gas diffusers are attached to the most distal cell unit in a cell in use (i.e. the cell unit furthest away from the surface of the body of water). The ability to remove only the most distal unit or an individual cell for maintenance of the gas diffusers is therefore easier than having to remove the entire reactor, and may avoid down-time of the reactor.

In certain embodiments, the first and/or second reactor further comprises deflector walls positioned between and/or around the cells to direct the flow of water through the cells. The deflector walls may be detachably attached to the buoyant structure and/or the cells. The deflector walls may be arranged to cause a substantially plug-flow effect of water flow through the cells. This may be advantageous for controlling biomass concentration. In certain embodiments, the reactor comprises a reactor inlet through which the water to be treated can enter the reactor, a reactor outlet through which the treated water can flow out of the reactor, and deflector walls to guide the flow of water through and between the cells of the reactor.

In certain embodiments, the system comprises a cover or covers for covering the body of water. In the case of a lagoon, the system may comprise a lagoon cover.

From another aspect, there is provided a method of treating water, the method comprising passing water to be treated through a first reactor and then a second reactor arranged in series in a body of water, the first and/or second reactors comprising at least one cell for housing biomedia, wherein the water is passed through a mid-settling zone between the first and second reactors before passing through the second reactor.

From yet another aspect, there is provided a method of treating wastewater, the method comprising allowing wastewater to pass through a first reactor adapted to house biomedia, through a mid-settling zone to allow for a solid phase to settle from a liquid phase in the wastewater, and through a second reactor adapted to house biomedia.

From a further aspect, there is provided a water treatment method comprising providing water to be treated through an inlet through, allowing the water to be treated to pass through a first reactor adapted to house biomedia, then a mid-settling zone, then a second reactor adapted to house biomedia, before being discharged as treated water through an outlet. Advantageously, the method avoids recirculation. The method is a continuous flow method, as defined above.

In certain embodiments, the method further comprises passing the water to be treated through an inlet settling zone before passing through the first reactor. In certain embodiments, the method further comprises passing the water to be treated through an outlet settling zone after the second reactor.

Any one or more of the mid-settling zone, inlet settling zone and outlet settling zone can comprise a non-aerated body of water. The first and/or second reactors may be aerated. The method may further comprise aerating the first and/or second reactor. The method may further comprise maintaining any one or more of the mid-settling zone, inlet settling zone and outlet settling zone non-aerated.

In certain embodiments, the method comprises retaining the water to be treated in any one or more of the mid-settling zone, inlet settling zone and outlet settling zone for enough time to allow for solid settling and/or sludge accumulation. In certain embodiments, the method comprises retaining sludge in one or more of the mid-settling zone, inlet settling zone or outlet settling zone.

In certain embodiments, the method comprises adapting the retention time in one or more of the mid-settling zone, inlet settling zone and outlet settling zone according to whether sludge retention is needed and/or settling of solids. In certain embodiments, the method comprises adapting the retention time in the mid-settling zone by changing the distance between the first and/or second reactors. In certain embodiments, the method comprises adapting the retention time in the inlet settling zone by changing the distance between the inlet and the first reactor. In certain embodiments, the method comprises adapting the retention time in the outlet settling zone by changing the distance between the outlet and the second reactor.

In certain embodiments, the first and/or second reactor comprise at least one cell or a plurality of cells arranged as an array and passing the water to be treated through the first and/or second reactor comprises passing the water through the at least one cell or the array of cells. In certain embodiments, the method further comprises floating the first and/or the second reactor in a body of water with the at least one cell immersed in the water. In certain embodiments, the method further comprises covering the at least one cell of the first and/or second reactor.

In certain embodiments, the method further comprises providing gas bubbles through at least one cell of the first and/or second reactor. In certain embodiments, the method further comprises aerating the first and/or second reactor. The gas bubbles may comprise fine bubbles and/or coarse bubbles. The coarse bubbles may be provided intermittently during use. The coarse bubbles may be provided substantially continuously during use. The method may comprise providing an anoxic region within the first and/or second reactor by providing gas bubbles in some cells and not providing gas bubbles in other cells within each reactor.

In certain embodiments, the method further comprises creating a substantially plug-flow effect of water flow through the at least one cell of the first and/or second reactor. The substantially plug-flow effect may be created by providing deflector walls positioned between and/or around the cells of the first and/or second reactors.

In certain embodiments, the method further comprises guiding the water through the first and/or second reactor. The first and/or second reactor may comprise a reactor inlet through which the water to be treated enters the reactor and a reactor outlet through which the water flows out of the reactor. The water may be guided along a tortuous path through the cells of the first and/or second reactor.

In certain embodiments, the method further comprises operating the second reactor at a lower loading rate than the first reactor. In certain embodiments, the second reactor is arranged to operate at about 30-70%, about 40-60%, or about 50%, of the loading rate of the first reactor.

The first reactor may be operated at a loading rate of about 2.0 to about 6.0 g of soluble carbonaceous biochemical oxygen demand per effective surface area per day ($sCBOD_5/m^2 \cdot d$), or about 2.5 g $sCBOD_5/m^2 \cdot d$. The second reactor may be adapted to operate at a loading rate of about 0.5 to about 1.5 g of soluble $CBOD_5/m^2 \cdot d$, about 0.75 to about 1.25 g of soluble $CBOD_5/m^2 \cdot d$, or about 1.25 g of soluble $CBOD_5/m^2 \cdot d$. In certain embodiments, the second reactor has a media loading rate of about 206 g of soluble CBOD per cubic meter of reactor per day.

In certain embodiments, for example when the system is operating at least partially in a tank or tanks, the first reactor may be adapted to operate at a loading rate of about 1.0 to about 2.0 g of soluble carbonaceous biochemical oxygen demand per effective surface area of biomedia per day ($sCBOD_5/m^2 \cdot d$), or about 1.4 g $sCBOD_5/m^2 \cdot d$. In certain embodiments, for example when the system is operating at least partially in a tank or tanks, the second reactor is adapted to operate at a loading rate of about 0.2 to about 1.0 g of soluble $CBOD_5/m^2 \cdot d$, about 0.4 g of soluble $CBOD_5/m^2 \cdot d$.

In certain embodiments, the method may further comprise blocking water flow around the first and/or second reactor using at least one baffle positioned around the first and/or the second reactor. The body of water may be an aerated or a non-aerated lagoon.

In certain embodiments, the method comprises retaining the water to be treated in any one or more of the inlet, outlet or mid-settling zones. In certain embodiments, the inlet settling zone has a hydraulic retention time of about 1.0 to about 3.0 days, about 1.5 to about 2.5 days, or about 2 days. The inlet settling zone may have an overflow rate of about 0.5 and 2.0 $m^3/m^2$ of mirror surface of body of water per day.

In certain embodiments, the hydraulic retention time of the outlet settling zone is about 0.5 to about 1.5 days, or about 1 day. The overflow rate of the outlet settling zone may be between about 1.0 and about 3.0 or between about 0.5 and about 2.0 $m^3/m^2$ of mirror surface of body of water per day.

In certain embodiments, the settling zone between the first and second reactors has a hydraulic retention time of about 1.0 to about 4.0 days, about 1.5 to about 3.5 days, about 2 to about 3 days, about 2.5 days. The settling zone between the first and second reactors may have an overflow rate of about 0.5 to about 2.0 $m^3/m^2$ of mirror surface of body of water per day.

As mentioned above, the hydraulic retention times may be higher when the method is performed in a body of water having a higher total retention time than needed.

In certain embodiments, the method further comprises placing biomedia within the at least one cell of the first and/or second reactor. In certain embodiments, the method further comprises contacting water to be treated with biomedia housed within the at least one cell of the first and/or second reactor. The biomedia may be of any suitable form or shape, such as the self-supporting unattached elongate thin film described above. In certain embodiments, the biomedia occupies a volume in the cell and/or reactor of about 1.00% up to 5.00%, between about 1.0 to about 3.0%, between about 1.3% and 4%, or between about 1.5% and about 3.5%.

The first and/or second reactors can take any suitable form in which microorganisms, such as bacteria, convert organic matter in the waste water through biological processes. In certain embodiments, the method further comprises modifying the length of each cell by adding or removing cell units. In certain embodiments, the first and/or second reactor comprises a frame defining openings which are sized and shaped to receive the at least one cell so that the at least one cell and/or at least one cell unit can be lifted into or out of the opening.

In certain embodiments, the method further comprises installing the first and/or the second reactor in a body of water, the installing comprising floating a buoyant structure of the first and/or second reactor on the body of water, then suspending the at least one cell from the buoyant structure and detachably attaching thereto.

In certain embodiments, the method further comprises removing at least one cell of the first and/or second reactor for maintenance, repair or de-installation, the removing comprising detaching the at least one cell from a buoyant structure of the first and/or second reactor, followed by lifting away from the buoyant structure. Once detached from the buoyant structure, the cell may be lifted out, for example through an opening of the buoyant structure, substantially vertically. Alternatively, the cell may be allowed to float sideways, then removed one unit at a time. Alternatively, the cell may be detached from the buoyant structure, lifted vertically through the buoyant structure and each cell unit detached and removed individually.

The method may further comprise filtering the water before an outlet of the body of water. The filter may be biomedia, as defined above, and having a density of about 160 to about 330 m$^2$ of biomedia per m$^3$ of water. The outlet is after the second reactor or the outlet settling zone. Treated water is discharged as treated effluent from the second reactor and/or the outlet settling zone.

Advantageously, embodiments of the present water treatment method do not require recirculation. Embodiments of the method comprise discharging treated water through the outlet after the treatment chain comprising at least the steps of treating in the first reactor, allowing solids to settle in the mid-settling zone, and treatment in the second reactor. By not recirculating the water through the system, the efficiency of the system and the method is not compromised as recirculation may increase overflow rate and reduce solids removal.

In certain embodiments, the method further comprises providing an anoxic region within the first and/or second reactor by not providing gas bubbles in at least one cell within the reactor. It is believed that aerobic bacteria degrade organic matter (carbonaceous matter) 10 to 20 times faster than anaerobic bacteria in low concentrations effluents such as domestic wastewaters. Moreover, the main byproducts of aerobic oxidation are carbon dioxide ($CO_2$) and water ($H_2O$) rather than odorous components such as anhydride sulfur gas ($H_2S$) as in the case of anaerobic digestion. Heterotrophic aerobic bacteria are preferred to perform the following reaction:

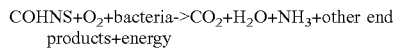

In aerobic treatment, ammonium can be almost completely converted into nitrates through a process called "nitrification" where adequate conditions are available. Nitrification is a two-step reaction accomplished by *Nitrosomonas* and *Nitrobacter* that can be summarized as follow:

As nitrates/nitrites formed by nitrification are problematic, they must be removed from the effluent from the aerobic section of the reactor. This is done in the anoxic environment ('denitrification'). Heterotrophic denitrification can be described by the following equation:

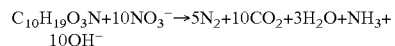

During biological denitrification, nitrate ($NO_3^-$) or nitrite ($NO_2^-$) is used as an electron acceptor for the oxidation of a variety of organic or inorganic electron donors. Organic compounds include hydrogen, methanol, carbohydrates, organic acids, alcohols, benzoates and other aromatic compounds.

Advantageously, by means of certain aspects and embodiments of the present disclosure, there is no need to replace existing infrastructure in a lagoon or pond or to add new basins or equipment such as a clarifier and/or recirculation to increase biomass concentration. In certain embodiments, the system and/or the method do not include a clarifier. Embodiments of the present system and reactor may be used in existing and new lagoon applications, and/or in any water body. Furthermore, the system and methods of the present disclosure may be applied to different bodies of water. For example, the first and/or second reactors may be incorporated in tanks outside of an aerated/non-aerated lagoon and one or more settling zones within one or more lagoons. So although the reactors and settling zones are combined in series, they are not all contained within a single body of water such as a lagoon.

The inventors have discovered that, in certain embodiments of the present system and method, by fixing biomass in a body of water together with two reactors in series and including a settling zone therebetween, a higher concentration as well as a more effective distribution of the biomass may be obtained. Advantageously, due to efficiency and speed of cleaning water of embodiments of the present disclosure compared to wastewater treatments of the prior art, embodiments of the present system and method do not require the entire surface of a body of water such as a lagoon to be covered by a wastewater system. In fact, by means of certain embodiments of the present disclosure, it is calculated that a 600% increase in the treatment capacity, treating 1800 cubic meters of domestic wastewater per day, is possible compared to only 300 cubic meters of domestic wastewater per day in a conventional aerobic lagoon of the prior art, while respecting the same discharge limit. Furthermore, by means of certain embodiments of the present disclosure, efficient nitrification can also be achieved in both summer and winter conditions.

By means of certain embodiments of the present disclosure, oxygen requirements are calculated according to $CBOD_5$ and ammonia requirements only. In certain embodiments, the fine bubble diffuser may provide aeration to meet the oxygen requirements without regard to mixing. Therefore, in certain embodiments, the body of water does not require additional aeration or mixing. In comparison, completely mixed aerated lagoons require a minimum mixing power of 5 to 15 m$^3$ air/min/1000 m$^3$ of water body (MD-DELCC). Furthermore, oxygen requirements for certain embodiments of the current disclosure can be adjusted down to account for the oxidation by nitrates if means of controlling heterotrophic denitrification through dissolved oxygen or ORP monitoring and automatic air flow adjustment are provided. In certain embodiments, the energy economy is in the order of 25 to 40% when compared to suspending biomass process or moving bed bioreactors of the prior art.

Although originally intended for enhancing lagoon treatment capacity, the inventors found that, surprisingly, the embodiments of the present disclosure may also be of interest for wastewater treatment wherever stringent discharge requirements are enforced (<25 mg/l BOD$_5$, <25 mg/l total suspended solids (TSS), ammonia or nitrogen removal); treatment skilled operators are not available; simplicity of operation and maintenance is mandatory and relative compactness is needed. In comparison, other technologies such as membrane filtration can be more compact and meet stringent requirements, but they are not as simple to install and maintain. Other biological treatments of the prior art such as activated sludge, sequencing batch reactor, moving bed bioreactor with fluidized bacterial support or biodisks operating at high biomass concentration require skilled operators and/or equipment. For example, sequencing batch reactors (SBR), such as that described in U.S. Pat. No. 8,758,620, have a treatment process in which water to be treated is treated in batches and not through a continuous movement of the water from an inlet to an outlet. Typically, SBRs have five phases: (1) FILL: water to be treated enters through an inlet and fills a tank; (2) REACT: the water in the tank is treated typically with aeration; (3) SETTLE: aeration and mixing is stopped and the solids are allowed to settle; (4) DECANT: clarified water is drawn through an outlet; and optionally (5) IDLE: waste sludge is removed. This is a very different process than the continuous system and process presently described. Advantageously, by means of certain embodiments of the present disclosure such as in those embodiments where anoxic regions are created, nitrification and denitrification is possible even at low temperatures which is seldom observed in lagoons.

By means of certain embodiments of the present system and method, the treatment potential can be greatly increased by installing the present system spanning over an entire surface of a body of water if required depending on the effluent quality required.

From another aspect, there is provided a reactor for treating water, the reactor comprising a buoyant structure for supporting at least one cell for suspension in a body of water in use, wherein each cell is removeably attachable to the buoyant structure and is arranged to house biomedia.

From another aspect, there is provided a reactor for treating water, the reactor comprising a buoyant structure for supporting at least one cell for suspension in a body of water in use, the at least one cell being arranged to house biomedia, wherein each cell is modular and comprises at least one unit, the units being detachably attachable to one another to vary the length of the cell.

From another aspect, there is provided a reactor for treating water, the reactor comprising a buoyant structure for supporting at least one cell for suspension in a body of water in use, the at least one cell being arranged to house biomedia and a gas diffuser.

From another aspect, there is provided a reactor for treating water, the reactor comprising at least one cell housing biomedia, wherein the biomedia is self-distributing and self-supporting and occupies less than about 3% of the volume in the cell and/or reactor. In certain embodiments, the biomedia provide an effective surface area of about 160 to about 330 m² per m³ of water volume.

In certain embodiments, the at least one cell comprises an array of cells attachable to the buoyant structure. In certain embodiments, the buoyant structure comprises a frame defining a plurality of openings therein. The openings may be sized and shaped to allow one cell to pass therethrough. The frame may be grid-like and may be formed from a plurality of pipes. In certain embodiments, the pipes are hollow to provide buoyancy. The pipes may be made of polyethylene, such as high density polyethylene.

In certain embodiments, the reactor further comprises at least one detachably attachable cover for substantially covering at least one of the openings of the buoyant structure or for substantially covering the at least one cell. The cover may be substantially light impermeable or light filtering.

In certain embodiments, the at least one cell comprises a water permeable wall arranged to retain biomedia within the cell. The water permeable wall may be a mesh. The at least one cell may also comprise a water permeable cover, such as a mesh, at the top of the cell, to keep biomedia submerged within water in use.

The reactor may further comprise biomedia housed within the wall of the at least one cell. In certain embodiments, the biomedia is self-supporting and comprises an unattached elongate thin film as described above.

In certain embodiments, the cells are modular and comprise at least one unit, the units being detachably attachable to one another to vary the length of the cell. The reactor may be installed and removed unit by unit or cell by cell.

In certain embodiments, the at least one cell of the first and/or second reactor contains at least one aeration device. The aeration device may be a gas diffuser. The aeration device may comprise two gas diffusers for producing bubbles of different sizes. The two gas diffusers may be separately controlled. For example, to provide fine bubbles substantially continuously during operation, and to provide coarse bubbles intermittently. The reactor may further comprise a gas supply for supplying gas to the aeration device. The pipes of the buoyant structure may function as gas conduits to the aeration devices.

DEFINITIONS

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

As used herein, the term "reactor" is to be taken to mean an apparatus or a place in which a biological reaction or process can be carried out to convert dissolved and/or suspended biological matter in waste water, using for example microorganisms (e.g. bacteria). The biological reaction includes, but is not limited to, nitrification, denitrification, phosphorus removal and/or carbon removal. The conversion may be aerobic, anaerobic or anoxic.

As used herein, the term "settling zone" is to be taken to mean any area or device in which biomass can be separated from liquid, such as a non-aerated body of water where solid matter can sediment from liquid matter with or without pre-coagulation or microballasting with heavy particles; lamellas; filtering with media (sand, rock, plastic, organic) or membrane, microscreening or flotation.

As used herein, the term "biomedia", also known as a bacteria growth device or biofilm support media, is to be taken to mean any media or device having a surface suitable for bacterial growth and/or attachment. Biomedia includes but is not limited to rocks, lava, coke, gravel, slag, foams, peat moss, ceramics, cords, sand or any plastic shapes such as strips. Such media may be selected according to their effective surface area, the volume they occupy, their distribution in a water body, their cost, their durability, their sloughing ability and their impact on oxygen transfer.

As used herein, the term "water treatment system" is to be taken to mean a system for cleaning or purifying water such as domestic or industrial wastewater or highly polluted water or polluted water originating from any means.

As used herein, the term "body of water" is to be taken to mean any one or more volume(s) of water which is to be treated. The body of water may be a single body of water, or multiple bodies of water joined together. The body of water may be man-made or natural. The term "body of water" includes ponds, lagoons, basins, tanks, and combinations of the same.

BRIEF DESCRIPTION OF DRAWINGS

Further aspects and advantages of the present invention will become better understood with reference to the description in association with the following in which.

DETAILED DESCRIPTION OF THE INVENTION

Figure 1:
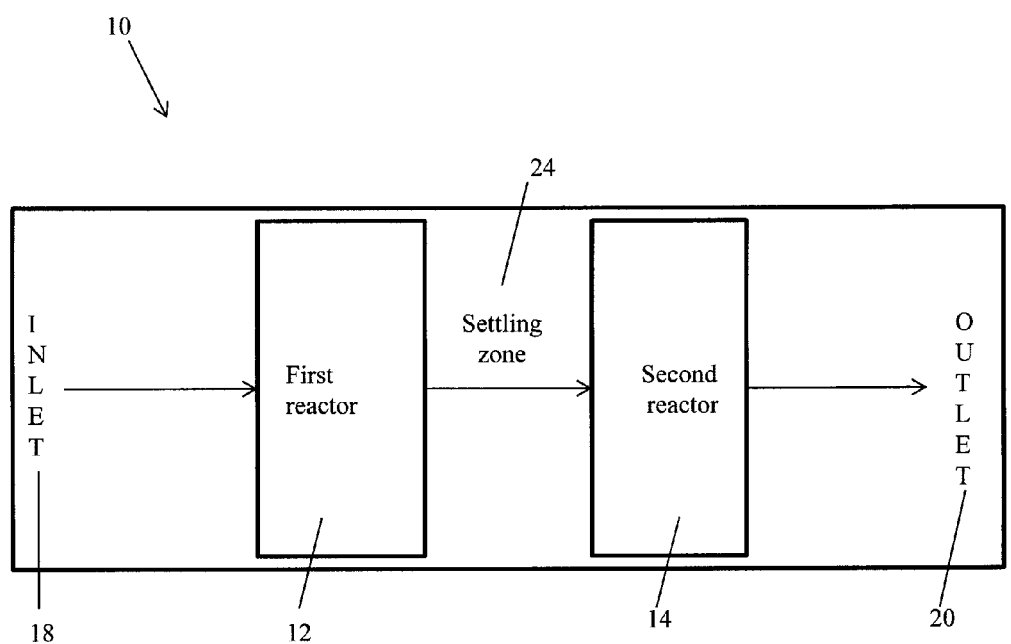
FIG. 1 is a schematic representation of a water treatment system comprising reactors and at least one settling zone according to an embodiment of the present disclosure.

The present invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items.

Furthermore, although an embodiment of the present invention described below with reference to FIGS. 2-7 describes a wastewater treatment system and method in a lagoon, the present invention can equally be used in or applied to any body of water or any combinations of bodies of water. Furthermore, discrete tanks could be provided as the body of water to delineate water treatment zones. The method and the system of the present disclosure can be applied to treating wastewater discharged from residential, commercial or community wastewater systems, as well as any liquid containing impurities in the present or in any other technical fields, such as industrial or agri-food wastewater. For this reason, expressions such as "waste water", and "septic" and the like should not be taken to limit the scope of the present invention and should be taken to include all other kinds of liquids or technical applications with which the present invention may be used and could be useful.

Moreover, in the context of the present invention, the expressions "wastewater", "water to be treated" and any other equivalent expression known in the art used to designate a substance displaying liquid-like features which may be contaminated or polluted or require cleaning in any other way, as well as any other equivalent expressions and/or compound words thereof, may be used interchangeably. Furthermore, expressions such as "polluted" and "contaminated" for example, may also be used interchangeably in the context of the present description.

In addition, although one embodiment of the present invention as illustrated in the accompanying drawings comprises various mechanical components, such as actuated ball valves, blowers, fine bubble diffusers, etc., and although one embodiment of the present invention as shown consists of certain geometrical configurations and arrangements, not all of these components, geometries and/or arrangements are essential to the present disclosure and thus should not be taken in their restrictive sense, i.e. should not be taken as to limit the scope of the present invention. It is to be understood, as also apparent to a person skilled in the art, that other suitable components and co-operations thereinbetween, as well as other suitable geometrical configurations and arrangements may be used in the wastewater treatment system and method according to the present invention, as will be briefly explained hereinafter, without departing from the scope of the invention. In the following description, the same numerical references refer to similar elements.

Referring to FIG. 1, there is shown a schematic representation of a water treatment system 10, according to an embodiment of the present disclosure, comprising a first reactor 12 and a second reactor 14 arranged to be placed in series in a body of water 16 having an inlet 18 and an outlet 20, the first and/or second reactor 12, 14 arranged to house biomedia 22 (shown in FIG. 7) for converting biomass. The water treatment system 10 comprises a mid-settling zone 24 between the first and second reactors 12, 14. By means of this arrangement, water to be treated flows through the first reactor 12, then the mid-settling zone 24, followed by the second reactor 14. Optionally, the water treatment system 10 further comprises an inlet settling zone 26 for primary clarification, sludge storage and/or retaining decantable (settleable) solids from raw sewage. Optionally, the water treatment system 10 further comprises an outlet settling zone 28 for final clarification and sludge storage zone at the outlet. In certain embodiments, a filter (not shown) is also provided at the outlet 20.

Figure 2:
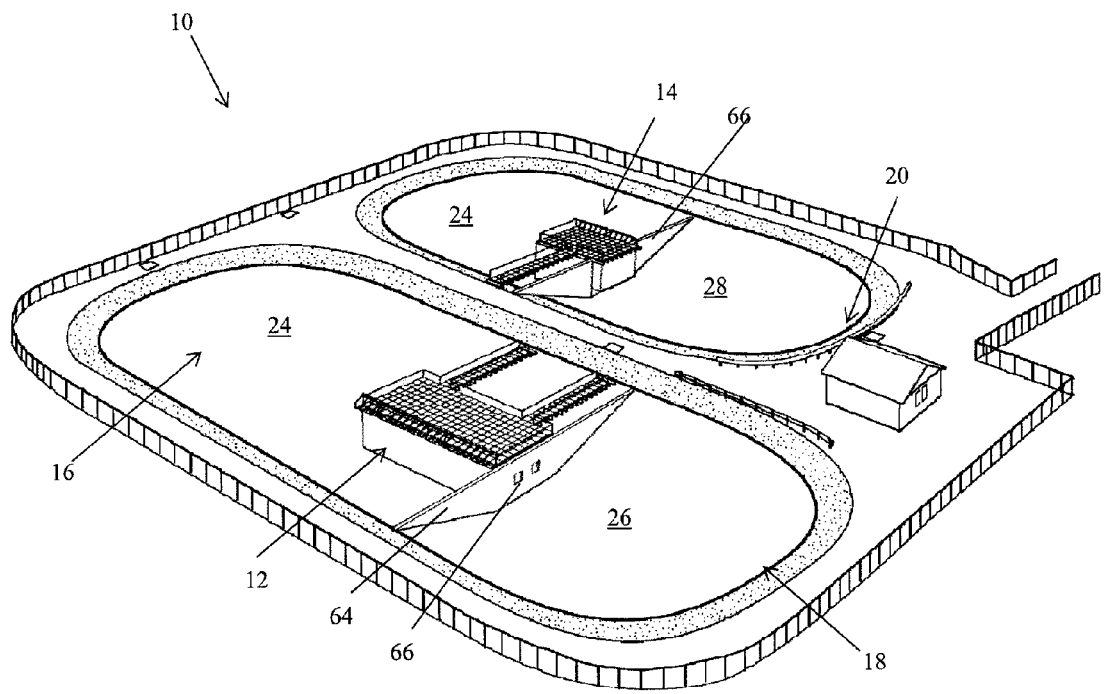
FIG. 2 is a schematic representation of a water treatment system when used in a lagoon, according to another embodiment of the present disclosure, the water treatment system comprising reactors having at least one cell and at least one settling zone.
Figure 3:
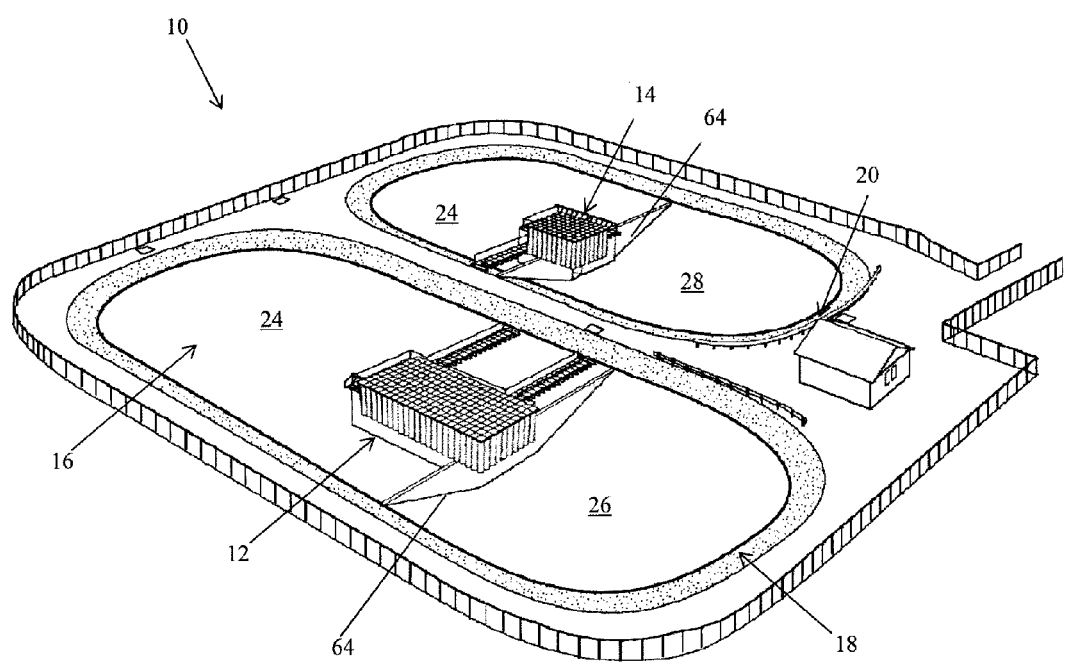
FIG. 3 shows the water treatment system of FIG. 2 in which the cells are visible.
Figure 4:
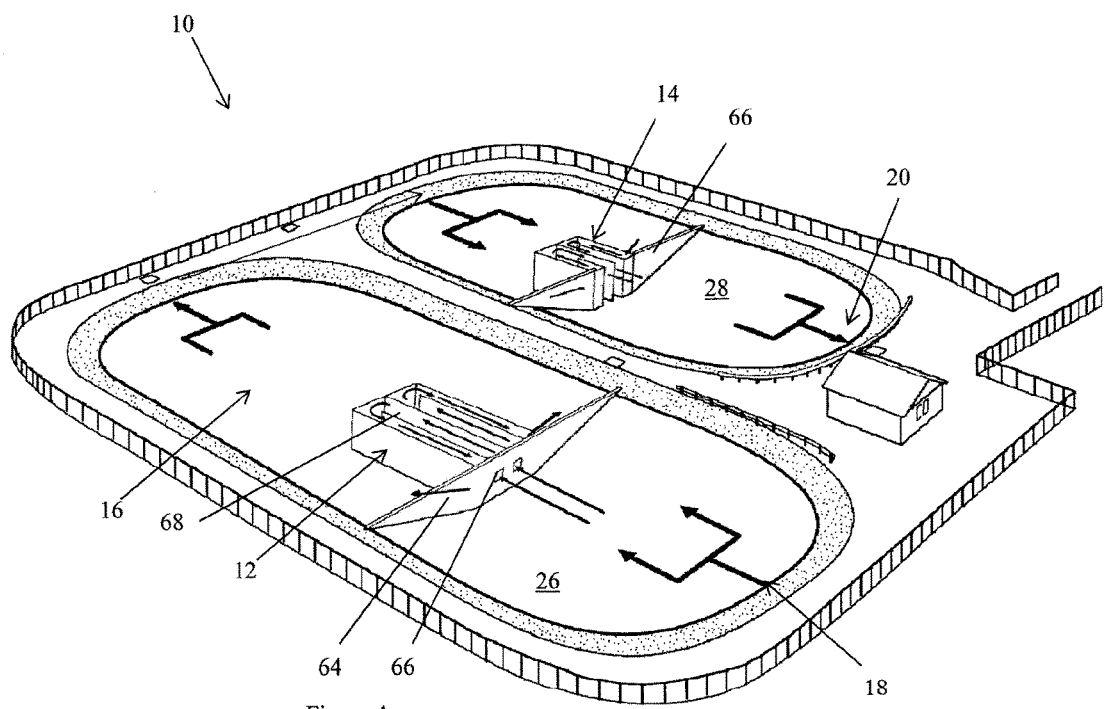
FIG. 4 shows the water treatment system of FIGS. 2 and 3 in which the direction of water flow through the system is indicated with arrows.

According to another embodiment which is illustrated in FIGS. 2-4, the body of water 16 comprises a lagoon having an inlet 18 and an outlet 20. In this embodiment, the lagoon has two basins in fluid communication with one another although the system 10 of the present disclosure can be adapted to be incorporated into any type of body of water or any combinations of different bodies of water, with any configuration. The embodiment of FIGS. 2-4 comprises (i) an inlet settling zone 26 upstream of the first reactor 12 and downstream of the inlet 18, (ii) a mid-settling zone 24 inbetween the first and second reactors 12, 14, and (iii) an outlet settling zone 28 downstream of the second reactor 14 and upstream of the outlet 28. The reactors 12, 14 and the settling zones 24, 26, 28 are positioned in series. There is no recirculation of water in this embodiment of the system 10.

The settling zones 24, 26, 28 are portions of the body of water 16 in which particulate matter such as sludge and scum can settle, for example by sedimentation, and be stored. Additional means of settling solid and particulate matter are also possible such as by filtering, screening or flotation. The inlet settling zone 26 of this embodiment, allows primary clarification and sludge storage for retaining settleable solids such as raw solids from raw sewage thereby allowing soluble matter to be treated by the first reactor 12. The mid-settling zone 24 is for settling and storing particulate matter leaving the first reactor 12. The outlet settling zone 28 is for settling the secondary particulate matter generated by the second reactor 14 which may avoid the need for a clarifying reactor or separate sludge removal. The reactors 12, 14 comprise at least one cell 32 for housing biomedia 22. Biomedia 22 is also known as a bacteria growth device or biofilm support media, has surfaces for bacteria to attach and grow on for converting biomass.

The reactors 12, 14 for use with embodiments of the present system and method can take any form. One embodiment of the reactors 12,14 is illustrated in FIGS. 2, 3, 5, 6 and 7, although it will be clear that other forms or types of reactors are possible. In this embodiment, each reactor 12, 14 is adapted to float in the body of water 16 by means of a buoyant structure 30 for supporting the cells 32 for suspension in the body of water. In other words, in this embodiment of the present system, the reactors 12, 14 have a two-part construction comprising the buoyant structure 30 and the cells 32. The cells 32 can be removeably attached to the buoyant structure 30. In this embodiment, the buoyant structure 30 comprises a first set of hollow pipes 34 connected to a second set of hollow pipes 36 which carry gas to gas diffusers 38 contained at a distal end of the cells 32. The first and second sets of pipes 34, 36 form a grid formation or a frame defining a plurality of openings 40. Each opening 40 defined by the frame may be considered a unit of the buoyant structure, and each buoyant structure unit is arranged to support one cell 32. Each unit may be quadrilateral, such as square or rectangular. In this way, the cells 32 can be arranged as an array and, in use, substantially immersed in the body of water as an array. The array of cells can be any configuration.

In this embodiment, the first set of hollow pipes 34 provide the predominant buoyancy of the buoyant structure, and the second set of hollow pipes 36 provide additional buoyancy. The first set of hollow pipes 34 have a wider diameter (about 10 inches in this embodiment) than the second set 36, have sealed ends and, in use, will sit partially in the water, whereas the second set of hollow pipes 36 are arranged above the first set of hollow pipes 34 when assembled and are used as aeration lines. It will be appreciated that any other configuration of the buoyant structure 30 is also possible which provides buoyancy to the cells. Connectors 42 are provided for connecting the first and second sets of hollow pipes 34, 36 to one another at approximately 90 degrees to each other. The connectors 42 comprise two faces, a bottom face comprising a first saddle which is sized and shaped for receiving a portion of pipe from the first set of hollow pipes 34, and a top face comprising a second saddle which is sized and shaped for receiving a portion of pipe from the second set of hollow pipes 36, the first and second saddles being arranged at right angles to one another. The second set of hollow pipes 36 can have male alignment studs that fit into female holes located on the connector to facilitate the construction of the buoyant structure 30. The saddles comprise two arms extending from a curved base. The first set of hollow pipes 34 may be manufactured with the connectors 42 preinstalled before delivery to the site for ease of installation. It will be appreciated that any other type or form of connector can be used.

The hollow pipes 34, 36 may comprise high density polyethylene (HDPE) or polyvinyl chloride, although it will be apparent to a skilled person that they can be made of any other material which can float or be made to float in the body of water and which has sufficient flexibility to mechanically withstand turbulence in the body of water, as well as removal and installation steps into/out of the body of water. Installation can be modular and comprises pulling or pushing the buoyant structure 30 into the water from the shore followed by attachment of the cells 32. It will be appreciated that the installation which may require considerable 'bend' of the hollow pipes due to a height difference between the shore and the water level. The buoyant structure offers flexibility to resist breakage under stress, such as waves or ice and installation/removal, but also allows enough rigidity to maintain the cells 32 in a substantially vertical configuration during aeration.

Figure 5:
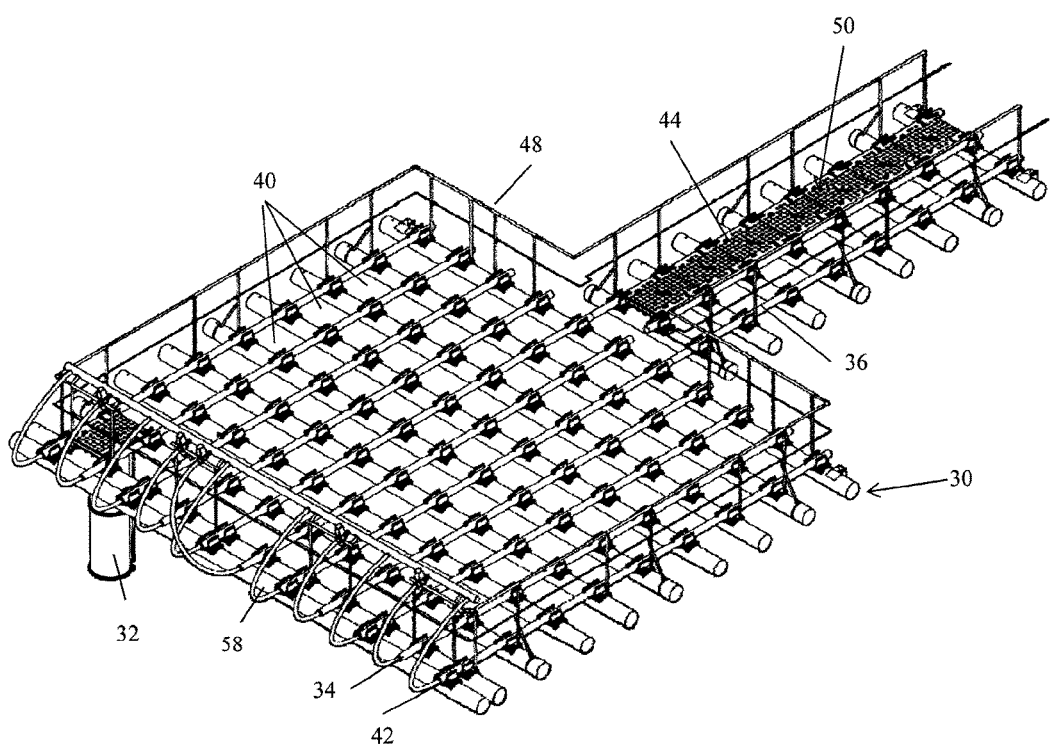
FIG. 5 shows one embodiment of a reactor which may be used with the method and system of the present disclosure, the reactor having a buoyant structure and at least one cell.
Figure 6:
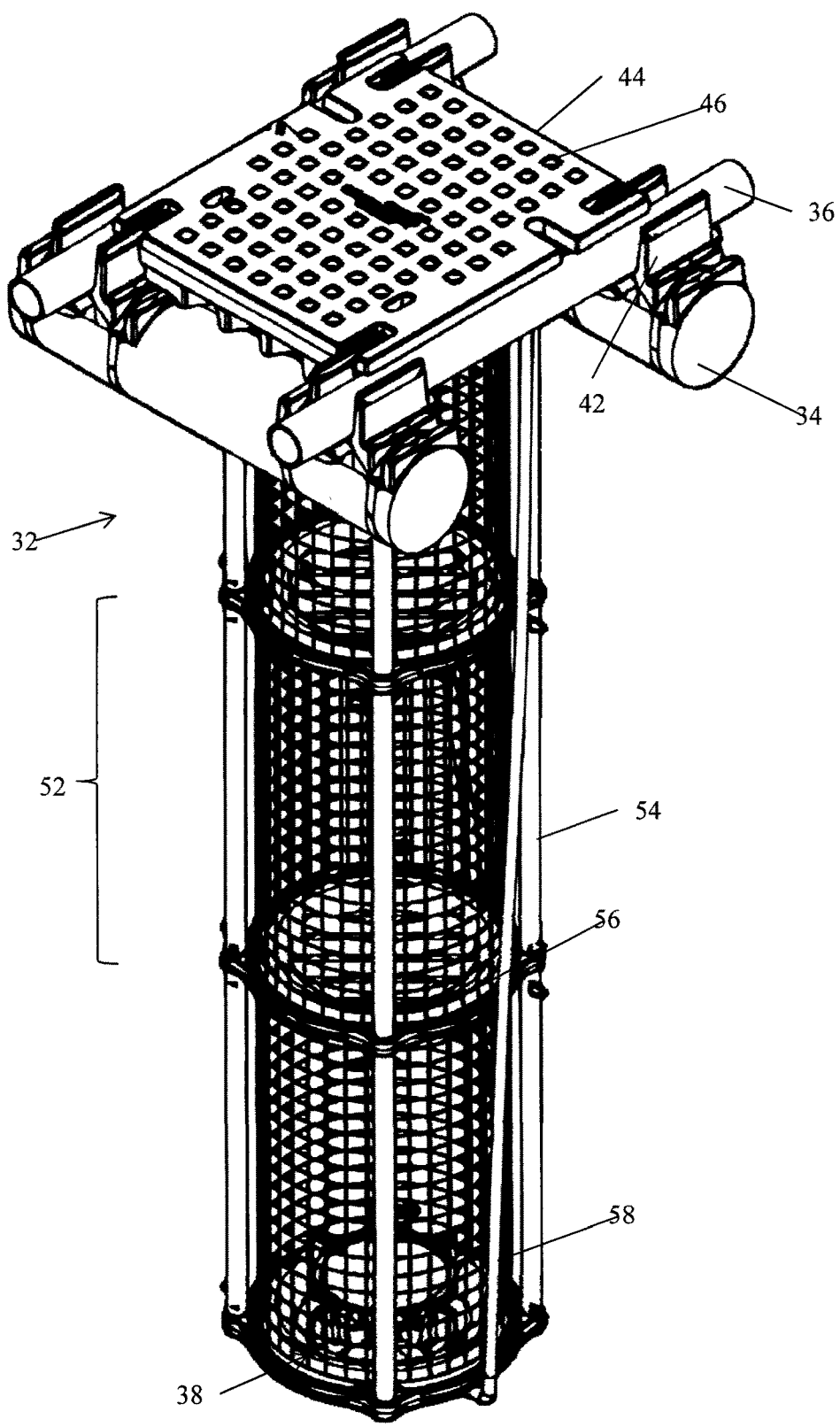
FIG. 6 shows one embodiment of a cell which may be used with the method and system of the present disclosure.
Figure 7:
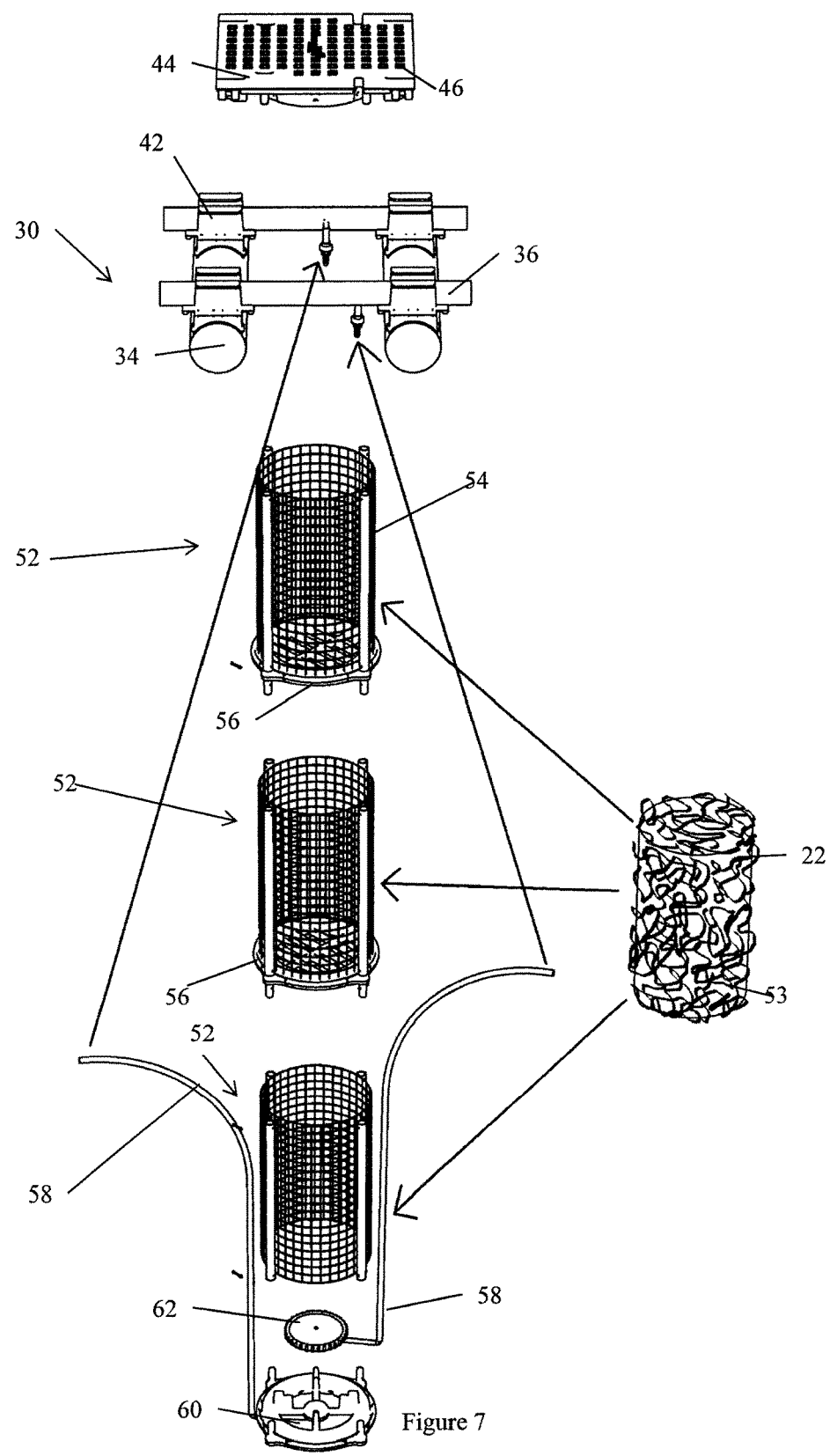
FIG. 7 shows an expanded view of the cell of FIG. 6.

Each reactor 12, 14 also comprises at least one cover or covers 44 for covering the grid units of the buoyant structure 30. The covers 44 may comprise tiles which can be removeably attached to the buoyant structure 30 by means of the hollow pipe connectors 42, or any other separate connecting means (not shown). In the embodiment of FIGS. 5-7, the covers are attached to the buoyant structure by means of the connectors in which the arms of the second saddle extend sufficiently from the base to be received in slots in the cover 44. A rubber O-ring around the top of the connectors 42 is one way of attaching the cover 44 and which can provide enough elasticity to adapt to the movement of the buoyant structure 30. The cover 44 may also include openings 46 across its surface to facilitate anchoring during lifting operations. Excess air flow from the gas diffuser 38 can be evacuated in the periphery of the covers 44 to prevent the formation of ice stalagmites during cold weather. Air is forced to evacuate against warmer air lines thus limiting ice formation. The covers 44 can also function as a flooring for providing safe above water walkway access to the reactor and/or the cells for ease of maintenance or repair. The buoyant structure 30 together with the covers 44 are raft-like. As the covers 44 extend over the cells 32 in use, they also provide a protection over the cells 32 and the water being treated. For example, the covers 44 may reduce or block UV light exposure to prevent undesirable biogrowth. Furthermore, the covers 44 may be arranged to absorb solar radiation to transfer heat to the water, to maintain the temperature of the water or to prevent ice formation. For example, the covers 44 may be formed of a dark colour to absorb solar radiation.

As best seen in FIG. 5, the buoyant structure 30 also includes a handrail 48 around the perimeter of the first and/or second reactor 12, 14 as a safety feature and which can also provide a support or housing for additional components to the reactor such as a power/gas/electrical supply. The handrail 48 also supports an air manifold and an electrical ball valve controlling air feed to the gas diffuser 38 for biofilm thickness control. One part of the buoyant structure 30 may be in the form of a walkway 50 only extending from the grid to provide access from land to the cells 32. The walkway may have no cells suspended therefrom.

The buoyant structure 30 may be constructed on site or provided pre-made as a dock or a raft. The first and/or the second reactor 12, 14 can be installed into the body of water by initially placing the buoyant structure 30 on the water, then attaching the cells 32 to the buoyant structure 30 by passing them through the grid openings 40. Once the cells 32 have been positioned and secured, the covers 44 may be fitted. The modular construction of the reactors and/or water treatment system enables its retrofitting into any size or shape body of water. Removal of the cells for maintenance is also simple and can be performed without skilled labour. For example, the cells can be lifted vertically through the buoyant structure openings, or be released from the buoyant structure and allowed to float horizontally.

Turning now to the construction of the cells in one embodiment, each cell 32 comprises one or more cell units 52 or cell segments for varying the length of the cells. Each cell unit 52 comprises a water permeable wall 53 (FIG. 7) for retaining the biomedia 22 within the cell supported by vertical support struts 54. FIGS. 6 and 7 illustrate a cell 32 comprising three units 52 although any number of units is possible. The cell units 52 of one cell 32 are separated vertically by a unit or segment divider 56 which also space apart the vertical struts 54 and impart a cylindrical shape to the cells 32. The segment divider 56 can be made of any material such as a polymer or concrete. In one embodiment, the segment divider 56 is non-buoyant (has a density less than that of water) to provide additional stability to the cell 32. The cells 32 can be adapted to be any size or shape. Within the most distal part of at least one cell unit in a cell, there is provided the gas diffuser 38. The gas diffuser 38 can also serve as the segment divider. The water permeable walls 53 are flexible and comprise a mesh or a net having openings sufficiently small to retain the biomedia 22 within the cell. In one embodiment, the cell 32 comprises the self-distributing self-supporting biomedia and the cell is attached to the cover of the buoyant structure to facilitate removal of the entire cell for maintenance by simply lifting the cover. In another embodiment, only the biomedia 22 or the mesh 53 is attached to the cover 44 of the buoyant structure 30 and can be removed by lifting the cover 44.

In the embodiment of FIGS. 1-3, each cell 32 is attached to the buoyant structure 30 by means of the covers 44. The vertical support struts 54 of the top cell unit are received into corresponding openings (not shown) in the cover 44 and secured by means of conventional connectors such as bolts and wing nuts. It will be appreciated that any means of securing the cell to the cover is included within the scope of the present disclosure. Each cell 32 is secured to the cover in a non-detachable or detachable manner. As the connection between the cover 44 and the buoyant structure 30 is detachable, the cells can be removed from the reactor by disconnecting the cover 44 from the buoyant structure and lifting the cover with the cell attached. In an alternative embodiment (not shown), each cell 32 is detachably attached to the buoyant structure 30 and not to the cover 44.

The cells 32 are modular in that cell units 52 can be stacked one on top of another to increase their total length. For example, each cell may have a one metre length. It has been found by the inventors that a length of about one metre prevents compaction of the biomedia 22 contained therein and imparts to the cell 32 a manageable weight for removeable and maintenance purposes taking into account the additional weight of a fully loaded biomedia with biofilm. The cage-like structure of each cell 32 also helps to minimize or reduce the weight of the structure as well as allowing for the movement of water in and out of the cells 32. The modularity of each cell 32 enables the provision of biomedia 22 throughout a depth of a body of water, even bodies of water with varying depth. Cell segments 52 can be detached from one another by removing connectors such as bolts or screws from the top of the struts 54 of each segment 52 and leaving the bottom segment divider 56 or gas diffuser 38 in the case of the last segment to retain the biomedia 22 in a basket type embodiment. This feature facilitates installation or removal of deep cells, especially when the biomedia is colonised with heavy biomass.

Turning now to the biomedia 22, any device which can support bacterial or biofilm growth to increase biomass concentration and to biologically consume impurities contained in the body of water within one of the reactors 12, 14 can be used. Biomedia with a high surface area to volume ratio is preferred. Incorporating such a biomedia within embodiments of the present disclosure increases sludge retention time when compared to what is possible in the majority of lagoon wastewater treatment systems, apparatuses and methods known in the art. For example, the large surface area to volume ratio of the biomedia may enable the oxidation of the toxic concentrations of ammonia/nitrite/nitrate where it was not previously possible in a lagoon.

In one embodiment, the biomedia comprises one or more elongate thin films or strips which can be loosely bundled up or intertwined in an unbound, nest-like configuration, the film or strip having surfaces for bacteria to attach and grow on. A suitable biomedia has been described previously in WO 03/027031 and WO2009033291, the contents of which are incorporated herein in their entirety. The biomedia is made of a non-toxic and non-biodegradable material. The biomedia comprises a material having a density close to that of water so that advantageously the biomedia can remain submerged and suspended within the body of water. The material of the biomedia may be selected from the group consisting of acrylonitrile butadiene styrene (ABS), polyvinyl chloride (PVC), high-density polyethylene, polypropylene or any other plastic that can be heated, extruded, molded, milled, cast and/or made in a way that will allow them to form strips which can be loosely packed together. Each strip of the biomedia 22 should be constructed and arranged so as to not compress or collapse or disintegrate over time and/or stop the flow of water passing therethrough.

With regard to the dimensional features of the biomedia 22, in certain embodiments these strips are preferably as thin as possible while being structurally sound and rigid at the same time. The rigidity is, among other factors, provided by the nature of the material used as well as the cross-sectional area of the strip. Each strip should be made of a suitable material and suitable dimensions such that it has sufficient structural integrity to not collapse on itself in order to not restrict passage of water between the strips.

In one embodiment, each strip is made of ABS although other materials can also be used. In one embodiment, each strip has a substantially rectangular cross-sectional area, a thickness of about 0.2 mm and a width of about 3.0 mm. The biomedia 22 can provide a surface area of up to about 330 $m^2$ per $m^3$ of biomedia volume, or about 165 $m^2$ of biomedia per $m^3$ of water.

In use, the biomedia 22 can occupy less than about 1.6% of the volume of water being treated. As the elongate strip biomedia can self-distribute in the water, it can provide an adequate distribution of bacteria in the volume of water being treated to therefore not require additional mixing. The biomedia is also sufficiently rigid to prevent its subsidence even under the maximal weight of bacteria. The bundled yet unbound structure of the biomedia also favors the shedding (sloughing) of excess sludge through movement of the elongate strip against itself or other strips. Also, the bundled configuration of the biomass does not clog, unlike biomedia of the prior art, therefore minimizing or avoiding the need for maintenance. Advantageously, embodiments of the present system utilizing such a fixed well distributed biomass do not require mixing of the body of water (e.g. aeration) thus requiring less energy than a fluidized process such as an aerated lagoon or a moving bed bioreactor.

Biofilm can reach a thickness of about 1 cm, and the sloughing of excess biofilm to maintain an ideal biofilm thickness can be helped by gas bubbles working only a couple of minutes each hour. The second set of hollow pipes 36 in the buoyant structure 30 comprises air lines 58. All air lines 58 connect to a manifold where one line out of two is closed by an electric ball valve or a similar timer controllable device. The gas diffusers 38 comprise a coarse bubble diffuser 60 and a fine bubble diffuser 62. The coarse bubble diffuser 60 is fed gas via the second set of hollow pipes 36 through a gas line, and the fine bubble diffuser 62 is fed gas via another adjacent hollow pipe 36 using another gas line. The gas bubble generation may be continuous or intermittent and be coordinated in a regular schedule depending on the rate of biofilm accumulation. In one embodiment, the fine bubble diffuser 62 provides a constant stream of fine bubbles for oxygenation of the biomedia, whereas the coarse bubble diffuser 60 is only switched on for a few minutes per hour for promoting sloughing. Therefore, the coarse bubble diffuser 60 has a timing control whereas the fine bubble diffuser has no timing control. In preferred embodiments, the gas lines feeding the bubble diffusers have a structure and/or are made from a material which resists compression by water and/or ice. For example, reinforced rubber tubing may be used such as rubber pipes reinforced with a helical polyethylene. In one embodiment, the coarse bubble diffuser 60 has a separate high-pressure compressor for supplying air than the fine bubble diffuser 62.

Gas bubbles for biofilm control are generated by the gas bubble diffusers 38 (aerators) in conventional manner. The coarse bubble aerator has several leveled openings at the bottom of an air space to evenly distribute bubbles. In one embodiment, the gas is air, however any other gas may be used, such as nitrogen or oxygen for example. In the illustrated embodiment, there are eight (8) aerator ⅛" openings. The gas bubble diffusers 38 are present at the bottom of each cell 32 as gas bubbles will rise through the water as a column of bubbles.

The gas bubble diffusers 38 also enable control of aeration conditions to provide aerobic and/or anoxic zones within the same reactor 12, 14. This means that nitrogen may also be eliminated with biological denitrification together with lowering biological oxygen demand (BOD) all within the same reactor.

In another embodiment, the coarse bubble diffusers are open pipes. Furthermore, the coarse bubble diffusers need not be present at the bottom of each cell 32 depending on the amount of sloughing required. For example, there may be a single course bubble diffuser provided at the bottom of a column of cell units.

Referring back to the system 10 of FIGS. 2-4, an embodiment of the system comprises at least one baffle 64 positioned across or around the first and/or the second reactor 12, 14 for preventing water flow around the first and/or the second reactor 12, 14. The baffles 64 are made of a flexible, water impermeable material such as a polymer or a rubber. In the case of baffles 64 which extend across the reactor, at least one baffle opening 66 is provided for allowing water to flow into the reactor. The baffles 66 are anchored to the bottom and sides of the lagoon such as by ballasting by a chain and are attached to the first set of hollow pipes 34 of the floating structure 30 using cables or cord. They provide a physical barrier to the flow of water causing the water to flow into the reactors 12, 14 and not around them. Holes in the baffles allow passage from one zone to another of the treatment chain. The height of the holes can be adjusted to optimize biomass separation. For instance, holes at the outlet of a clarification and storage zone can be located at the bottom to benefit from sludge blanket filtering accumulating near the exit. They can also be located in the middle to retain sludge at the bottom and scum at the top. Overflow from the top of the deflector wall can be desirable in situations where no scum is expected.

An embodiment of the system 10 also comprises deflector walls 68 (FIG. 4) positioned between the cells 32 to direct the flow of water through the first and/or second reactors 12, 14. In the example of FIG. 4, the deflector walls 68 are arranged to cause substantially a plug-flow effect of water flow through the cells 32. By plug-flow is meant that the concentration of the water varies along the water path through the reactor i.e. there is a concentration gradient through the path. Plug-flow conditions can generate a faster growth rate of the bacteria on the biomedia (theoretically about 3.9 times faster than that of a completely mix reactor for a first order kinetic). The deflector walls 68 are arranged to create long narrow channels. In one embodiment the channels are at least 2 m wide and 33 m long. In FIG. 4, it can be seen that the deflector walls 68 divide the reactor into two to maximise the distance through the reactor. The deflector walls 68 can provide any configuration of water path through the reactor, whether straight or tortuous depending on the load of the water being treated and the configuration of the body of water. The reactors 12, 14 can be positioned such that the reactor inlets and outlets are located in a way to maximize the path of a particle with respect to adjacent clarification and storage zones. In this respect, the reactors 12, 14 have an impermeable outer wall for retaining water within, and only allowing water flow in and out of the reactor inlet and outlet, respectively.

In another embodiment, a filter (not shown) is provided around the final outlet 20 of the lagoon. The filter can be a bundle of biomedia as described above, within a net and having a density in the water of about 330 $m^2$ of biomedia per $m^3$ of water.

According to embodiments of the present disclosure, the second reactor 14 does not need to handle the same amount of load as the first reactor 12 in order to meet target specifications. In fact, in certain embodiments, the second reactor 14 is arranged to handle a lower loading than the first reactor 12. The second reactor 14 may be arranged to operate at about 30-70%, about 40-60%, or about half the loading rate compared to the first reactor 12. Fermentation and hydrolysis of sludge can reduce sludge volume and slightly increase organic soluble matter flowing through the first reactor. Operating the first reactor 12 at a high soluble biological oxygen demand (BOD) loading rate can produce biomass with good settling characteristics. By "high soluble BOD loading rate" means higher than about 2.0 g $sCBOD_5$/ $m^2$ of biomedia per day. In certain embodiments, the first reactor 12 is adapted such that approximately half the BOD is oxidized to carbon dioxide by the first reactor 12.

The second settling zone 24 can allow the retention of approximately another quarter of influent BOD through settling of up to about 75% of suspended solids almost entirely composed of biomass generated from soluble $CBOD_5$ from the first reactor 12. Again, fermentation and hydrolysis are likely to take place in the accumulated sludge at the bottom of the water body. The second reactor 14 is adapted to be operated at lower organic load to produce a high quality effluent. A lower surface loading of the biomedia can provide better contact time of soluble and particulate substrates with the biofilm. Entrapment of finer particles in the biofilm and advanced conversion of soluble substrates can lead to low $CBOD_5$ concentration. Settling characteristics of biomass detaching from the second reactor may be lower than in the first settling zone, but a low overflow rate in the final settling zone and final filtration of effluent through dense biomedia upstream of the outlet may result in a concentration below about 15 mg/l for both $BOD_5$ and TSS even at temperatures as low as about 0.5° C. In certain embodiments, at temperatures above about 8° C., full nitrification may be possible depending on the loading rates and nitrogen removal if anoxic zones are created. When the temperature of the water falls below 8° C., the autotrophic biomass growth slows while decay continues but the accumulated autotrophic biomass during the warmer months allows partial nitrification down to near freezing conditions. The first and the second reactors 12, 14 may be adapted to achieve a 5 day hydraulic retention time (HRT) system to achieve required effluent levels. Compare this with a traditional aerated lagoon, where typically a 15-60 day HRT is required in order to meet regulations (see e.g. KRANTZ-BERG, G. (2010). *Advances in water quality control*. Scientific Research Publishing, USA).

Embodiments of the present disclosure can reduce the HRT down to about 5 days. In other words, embodiments of the present method and system do not require long hydraulic retention times. Embodiments of the present method and system have a HRT of less than 15 days, less than 10 days, less than 9 days, less than 8 days, less than 7 days, less than 6 days, or less than 5 days. In this way, loading can be increased by at least two-fold. Hydraulic retention time, can be understood to mean the measure of the average length of time that a soluble compound of wastewater remains in a bioreactor system. Hydraulic retention time is calculated by dividing the system volume by the wastewater flow rate (see e.g. Federation of Canadian Municipalities and National Research Council (FCMNRC), 2004. Optimization of Lagoon Operation. https://www.fcm.ca/Documents/reports/Infraguide/Optimization_of_Lagoon_Operations_EN.pdf).

In one embodiment, the first reactor 12 is adapted to operate at a loading rate of about 2.0 to about 6.0 g of soluble carbonaceous biochemical oxygen demand per effective surface area of biomedia per day ($sCBOD_5/m^2 \cdot d$), or about 2.5 g $sCBOD_5/m^2 \cdot d$. The second reactor 14 is adapted to operate at a loading rate of about 0.5 to about 1.5 g of soluble $CBOD_5/m^2 \cdot d$, about 0.75 to about 1.25 g of soluble $CBOD_5/m^2 \cdot d$, or about 1.25 g of soluble $CBOD_5/m^2 \cdot d$.

In one embodiment, the inlet settling zone 26 is adapted to have a hydraulic retention time of about 1.0 to about 3.0 days, about 1.5 to about 2.5 days, or about 2 days, and/or an overflow rate of about 0.5 and 2.0 $m^3/m^2$ of mirror surface of body of water, per day.

In one embodiment, the outlet settling zone 28 is adapted to have a hydraulic retention time of about 0.5 to about 1.5 days, or about 1 day, and/or an overflow rate of between about 0.5 and about 3.0 or about 0.5 and about 2.0 $m^3/m^2$ of mirror surface of body of water per day.

In one embodiment, the settling zone 24 between the first and second reactors 12, 14 is adapted to have a hydraulic retention time of about 1.0 to about 4.0 days, about 1.5 to about 3.5 days, about 2 to about 3 days, about 2.5 days, and/or an overflow rate of about 0.5 to about 2.0 $m^3/m^2 \cdot d$.

Referring now to an embodiment of a method of treating water, the method comprises passing water to be treated through the first and second reactors 12, 14 arranged in series in the lagoon of the system 10 described above, wherein the water is passed through the mid-settling zone 24 between the first and second reactors 12, 14 before passing through the second reactor 14. In a preferred embodiment, the water to be treated is additionally passed through the inlet settling zone 26 which is upstream of the first reactor 12 and/or the outlet settling zone 28 which is downstream of the second reactor 14. The treated water is discharged as treated effluent from the second reactor 14 and/or the outlet settling zone 28.

The method may comprise creating aerobic and anoxic areas within the same reactor. In one embodiment, an aerobic area is created by bubbling oxygen-containing gas using the gas diffusers 38 in cells 32 in a first portion of the array of cells 32 whilst cells in a second portion of the array remain anoxic by keeping the diffusers turned off. Alternatively, the reactors may be aerated in any other way. In certain embodiments, the settling zones are non-aerated, by turning off aeration of the lagoon for example.

Advantageously, embodiments of the present system and method do not require recirculation of the wastewater. In other words, treated water is not fed back to the first reactor after leaving the second reactor. By means of certain embodiments and aspects of the present disclosure, some problems associated with recirculation, such as reduction of clarification zone capacity and efficiency, can be minimised or avoided.

Identification of equivalent systems and methods are well within the skill of the ordinary practitioner and would require no more than routine experimentation, in light of the teachings of the present disclosure.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein. For example, it will be appreciated that any other reactor can be used in the present system and method. The reactors need not be buoyant. The at least one cell of the reactor can take any form or shape. The biomedia need not be a thin film as described but may also take any other form or shape. All references cited herein are incorporated by reference in their entirety and made part of this application.

Practice of the disclosure will be still more fully understood from the following examples, which are presented herein for illustration only and should not be construed as limiting the disclosure in any way.

EXAMPLES

The following examples are illustrative of the wide range of applicability of the present invention and are not intended to limit its scope. Modifications and variations can be made therein without departing from the spirit and scope of the invention. Although any method and material similar or equivalent to those described herein can be used in the practice for testing of the present invention, the preferred methods and materials are described.

Example 1—Water Treatment System and Method

A pilot study was conducted of a water treatment system in a body of water, the system having a water treatment chain comprising an inlet settling zone followed by a first reactor followed by a mid-settling zone, followed by a second reactor, followed by an outlet settling zone. The body of water comprised a limited access 20 foot sea container containing the reactors and settling zones. The inlet settling zone had a hydraulic retention time of about 1.5 day and an overflow rate of about 1.1 m$^3$/m$^2$·d. The first reactor comprised 2 cells operating at a load of about 1.4 g sCBOD$_5$/m$^2$·d. The mid-settling zone had a hydraulic retention time of about 1 day and an overflow rate of about 1.7 m$^3$/m$^2$·d. The second reactor comprised 1 cell operating at a load of about 0.4 g sCBOD$_5$/m$^2$·d. The outlet settling zone had the same design as the mid-settling zone. The different zones were separated by fiber glass deflectors. The body of water was fed with municipal wastewater through an inlet and treated water collected through an outlet. The cells of the first and second reactors comprised fine and coarse bubble diffusers. The cells contained the thin elongate unattached biomedia strips described above. The fine bubble diffusers were switched on continuously and the coarse bubble diffusers were activated for 3 minutes per hour.

Preliminary testing of the final effluent after less than 10 months of treatment time showed an average CBOD$_5$ and TSS concentration of 5.2 mg/l and 6.5 mg/l respectively. The nitrification rate was 89% and nitrogen removal was 27% with no optimisation of the aeration levels. Since nitrification is influenced by water temperature, ammonia removal the results can be separated in two distinct periods. During the winter season (December 21 to March 20) the nitrification rate was 76%. For the period outside the winter season, the nitrification rate was 96%.

Example 2—Lagoon Water Treatment System and Method

A full scale study was conducted of a water treatment system in a body of water, the system having a water treatment chain comprising an inlet settling zone followed by a first reactor followed by a mid-settling zone, followed by a second reactor, followed by an outlet settling zone. The body of water comprised about one third of an existing lagoon containing the reactors and settling zones. The inlet settling zone had a hydraulic retention time of about 1.8 day and an overflow rate of about 1.9 m$^3$/m$^2$·d. The first reactor comprised 10 cells operating at a load of about 3.9 g sCBOD$_5$/m$^2$·d. The mid-settling zone had the same design as the inlet settling zone. The second reactor comprised 5 cells operating at a load of about 0.9 g sCBOD5/m2·d. The outlet settling zone had the same design as the inlet settling zone and the mid-settling zone. The different zones were separated by polyester curtains. The body of water was fed with municipal wastewater through an inlet and the treated water was collected through an outlet. The cells of the first and second reactors comprised fine and coarse bubble diffusers. The cells contained the thin elongate unattached biomedia strips described above. The fine bubble diffusers were switched on continuously and the coarse bubble diffusers were activated for 3 minutes per hour. Preliminary testing of the final effluent after less than 9 months of treatment time showed an average CBOD$_5$ and TSS concentration of 9.1 mg/l and 6.3 mg/l respectively. Nitrification did not take place during this period since the system was installed at the end of the month of September when water temperature was too cold to allow a sufficient autotrophic biomass growth.

It should be appreciated that the invention is not limited to the particular embodiments described and illustrated herein but includes all modifications and variations falling within the scope of the invention as defined in the appended claims.

The invention claimed is:

1. A water treatment system comprising:
    a first reactor and a second reactor arranged to be placed in series in a body of water between an inlet of the body of water and an outlet of the body of water, at least one of the first and second reactor comprising at least one cell for housing biomedia,
    at least one baffle extending from at least one of the first reactor and the second reactor for preventing water flow around the at least one of the first reactor and the second reactor, and
    a mid-settling zone between the first reactor and the second reactor for separating solids in the water.

2. The water treatment system of claim 1, further comprising one or more of an inlet settling zone upstream of the first reactor and an outlet settling zone downstream of the second reactor.

3. The water treatment system of claim 1, wherein the first reactor is adapted to operate at a loading rate of about 2.0 to about 6.0 g of soluble carbonaceous biochemical oxygen demand per effective surface area of biomedia per day (g sCBOD$_5$/m$^2$·d).

4. The water treatment system of claim 1, wherein the second reactor is adapted to operate at a loading rate of about 0.5 to about 1.5 g of soluble carbonaceous biochemical oxygen demand per effective surface area of biomedia per day (g sCBOD$_5$/m$^2$·d).

5. The water treatment system of claim 1, wherein the second reactor is arranged to operate at about 30-70% lower than the loading rate of the first reactor.

6. The water treatment system of claim 1, wherein the at least one baffle is positioned across a flow path in the body of water for directing the water through the first and/or the second reactor.

7. The water treatment system of claim 1, further comprising an inlet settling zone upstream of the first reactor, the inlet settling zone having a hydraulic retention time of about 1.0 to about 3.0 days.

8. The water treatment system of claim 1, further comprising an outlet settling zone downstream of the second reactor, a hydraulic retention time of the outlet settling zone being about 0.5 to about 1.5 days.

9. The water treatment system of claim 1, wherein the mid-settling zone between the first and second reactors has a hydraulic retention time of about 1.0 to about 4.0 days.

10. The water treatment system of claim 1, wherein the mid-settling zone between the first and second reactors has an overflow rate of about 0.5 to about 2.0 m$^3$/m$^2$·d.

11. The water treatment system of claim 1, wherein the body of water is a lagoon.

12. The water treatment system of claim 1, further comprising a filter at the outlet of the body of water.

13. The water treatment system of claim 1, wherein at least one of the first and/or second reactor comprise a plurality of cells arranged as an array, and the first and/or the second reactor are adapted to float in the body of water, each cell having a plurality of cell units extending vertically into the water in use, each cell unit being arranged to house the biomeda.

14. The water treatment system of 13, wherein the first and/or second reactor is modular, at least one of the plurality of cell units being removeably attachable.

15. The water treatment system of claim 1, further comprising biomedia housed within the at least one cell of the first and/or the second reactor, the biomedia comprising an unattached elongate thin film having a nest-like configuration in use and configured to be self-supporting within the water.

16. The water treatment system of claim 1, wherein a hydraulic retention time of the system is less than 15 days or less than 10 days.

17. The system of claim 1, further comprising a filter at the outlet of the body of water, wherein the filter is biomedia having a surface area of about 160 to about 330 m² per cubic meter.

18. The system of claim 1, wherein the at least one baffle extends from the at least one of the first and the second reactors towards a side of the body of water.

19. A water treatment system comprising:
a first reactor and a second reactor arranged to be placed in series in a body of water between an inlet of the body of water and an outlet of the body of water, the first and/or second reactor arranged to house biomedia,
a settling zone between the first reactor and the second reactor,
at least one baffle positioned across a flow path in the body of water and around at least one of the first reactor and the second reactor for directing water through the at least one of the first reactor and the second reactor, and for providing a water treatment chain from the inlet to the outlet, through the first reactor, the settling zone, and the second reactor, without recirculation of the water.

20. A water treatment system comprising a first reactor and a second reactor arranged to be placed in series in a body of water between an inlet of the body of water and an outlet of the body of water, the first and/or second reactor arranged to house biomedia, a mid-settling zone between the first and second reactors for separating solids in the water, the system arranged to form a water treatment chain from the inlet to the outlet through the first reactor, the mid-settling zone, and the second reactor without recirculation of the water, the first and/or second reactor being adapted to float in the body of water, and the biomedia having a surface area of about 160 to about 330 m² per cubic meter.

* * * * *